United States Patent
Lee et al.

(10) Patent No.: US 9,525,507 B2
(45) Date of Patent: Dec. 20, 2016

(54) METHOD OF TUNING WAVELENGTH IN TIME AND WAVELENGTH DIVISION MULTIPLEXING-PASSIVE OPTICAL NETWORK (TWDM-PON)

(71) Applicant: ELECTRONICS AND TELECOMMUNICATIONS RESEARCH INSTITUTE, Daejeon-si (KR)

(72) Inventors: Han Hyub Lee, Daejeon-si (KR); Kwang Ok Kim, Jeollabuk-do (KR); Kyeong Hwan Doo, Daejeon-si (KR); Sang Soo Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 2 days.

(21) Appl. No.: 14/740,480

(22) Filed: Jun. 16, 2015

(65) Prior Publication Data
US 2015/0365191 A1 Dec. 17, 2015

(30) Foreign Application Priority Data

Jun. 16, 2014 (KR) .......... 10-2014-0073146
Nov. 10, 2014 (KR) .......... 10-2014-0155482
Jun. 11, 2015 (KR) .......... 10-2015-0082701

(51) Int. Cl.
*H04J 14/02* (2006.01)
*H04J 14/08* (2006.01)

(52) U.S. Cl.
CPC .......... *H04J 14/0246* (2013.01); *H04J 14/025* (2013.01); *H04J 14/08* (2013.01)

(58) Field of Classification Search
CPC .......... H04J 14/0238; H04J 14/0239
See application file for complete search history.

(56) References Cited

U.S. PATENT DOCUMENTS 6,411,410 B1    6/2002 Wright et al.
7,583,669 B2    9/2009 Yoo et al.
(Continued)

OTHER PUBLICATIONS

Editor G.989.3; Draft new Recommendation ITU-T G.989,3 (for Consent, Apr. 4, 2014); Question(s): 2/15 Mar. 24-Apr. 4, 2014; International Telecommunications Union Telecommunication Standardization Sector Study Period 2013-2016; Study Group 15 TD 200 Rev. 1 (PLEN/15); 159 pages.

*Primary Examiner* — Shi K Li
(74) *Attorney, Agent, or Firm* — Ladas & Parry LLP

(57) ABSTRACT

A method of tuning a wavelength in a TWDM-PON which has a plurality of operable channels is provided. First, a second channel is added as an operating channel of the TWDM-PON in which at least a first channel is working, and then an OLT that is providing a service to an ONU through the first channel requests the ONU to tune to the second channel. In response to receiving the request, the ONU determines whether a downstream wavelength of the second channel has been recorded thereon. According to the determination result, the ONU sends to the OLT an ACK message that indicates that the ONU is able to perform wavelength tuning and then commences wavelength tuning to the second channel, or the ONU sends to the OLT a NACK message that indicates that the ONU is unable to perform wavelength tuning.

10 Claims, 15 Drawing Sheets

(56) References Cited

U.S. PATENT DOCUMENTS

| | | |
|---|---|---|
| 8,824,890 B2 | 9/2014 | Lee et al. |
| 2006/0127091 A1 | 6/2006 | Yoo et al. |
| 2012/0128360 A1 | 5/2012 | Lee et al. |
| 2015/0318929 A1* | 11/2015 | Gao .................... H04B 10/572 398/72 |
| 2016/0080105 A1* | 3/2016 | Khotimsky ......... H04J 14/0232 398/34 |

* cited by examiner

FIG. 7

| Octet | Content | Description |
|---|---|---|
| 1-2 | ONU-ID | Directed message to one ONU. |
| 3 | 0×22 | Message type ID "Tuning_Response". |
| 4 | SeqNo | Unicast PLOAM sequence number. |
| 5 | Operation Code | 0-ACK, 6 applied, ignores bytes 7-40;<br>1 - NACK, byte 6 applied, ignores bytes 7-40;<br>2 - Complete_u, bytes 7-8 applied, ignores bytes 6 and 9-40;<br>3 - Complete_u, bytes 7-8 applied, ignores bytes 6 and 9-40;<br>4 - ROLLBACK, bytes 7-8 applied, ignores bytes 6 and 9-40; Other values reserved. |
| 6 | Response code | 0- ACK<br>1- NACK by not ready yet<br>2- NACK by out of supported TX tuning range<br>3- NACK by out of supported RX tuning range<br>4- NACK by out of both supported TX and RX tuning range Other values reserved<br>5- NACK by lacking wavelength channel calibration information<br>Other values reserved. |
| 7 | 000U 000D | wavelength tuning result (U: Upstream wavelength. D: Downstream wavelength)<br>0 - Wavelength was unchanged,<br>1 - Wavelength tuning has occurred. |
| 8 | 0AAA 0BBB (TBD) | Destination wavelengths to which the ONU has newly tuned.<br>AAA: Number of upstream wavelength 0-7(TBD)<br>BBB: Number of downstream wavelength 0-7(TBD) |
| 9-40 | Padding | Set to 0×00 by the transmitter; treated as "don't care" by the receiver. |
| 41-48 | MIC | Message integrity check |

FIG. 8

| Octet | Content | Description |
|---|---|---|
| 1-2 | ONU-ID | Directed message to one ONU. |
| 3 | 0×22 | Message type ID "Tuning_Response". |
| 4 | SeqNo | Unicast PLOAM sequence number. |
| 5 | Operation Code | 0 - Request; |
| 7-8 | Scheduled SFC | The superframe counter value for the moment in the future when the ONU has to commence the transceiver tuning operation.<br><br>The specified value pertains to both downstream and upstream tuning, as separating the values adds unnecessary complexity. Whenever separate tuning is required or is deemed beneficial, two unidirectional tuning actions executed serially can be considered |
| 9 | 0000 000R | This byte is a bit field with the following significance::<br>R=1, rollback forced when tuning fails ;<br>R=0, no rollback forced when tuning fails ; |
| 10-12 | Target downstream CHIX | The TWDM channel index of the destination downstream wavelength channel. In principle, the 32-bit PON-D can be used instead. |
| 13-15 | Target upstream CHIX | The TWDM channel index of the upstream downstream wavelength channel. The 32-bit PON-ID may not be defined (in one-to-many channel association cases). For static channel association, the two target CHIX values are identical |
| 16 (newly added) | 0000 000R | This byte is a one bit field with the following significance :<br>R=0, normal channel tuning request, if no calibration information, respond NACK and do nothing;<br>R=1 Calibrate the target channel first and tune to the target channel; Other values are reserved. |
| 17-40 | Padding | Set to 0×00 by the transmitter; treated as "don't care" by the receiver. |
| 41-48 | MIC | Message integrity check. |

FIG. 13

| Octet | Content | Description |
|---|---|---|
| 1-2 | Unassigned ONU-ID | Unassigned ONU-ID |
| 3 | 0×13 | Message type ID "Calibration_Request" |
| 4 | 0×00 | Sequence number |
| 5-8 | Vendor_ID | The code set for the Vendor ID is specified in [ATIS- 03002220]. The four characters are mapped into the 4-byte field by taking each ASCII/ANSI character code and concatenating them.<br><br>Example : Vendor_ID = ABCD → Byte 5 = 0×41, Byte 6 = 0×42, Byte 7 = 0×43, Byte 8 = 0×44. |
| 9-12 | VSSN | Vendor-specific serial number. |
| 13 | UUUU 0000 | UUUU - Upstream wavelength Channel ID, where the transmission has been received. |
| 14-15 | 0×CCCC | 0×CCCC - an ONU-generated non-zero correlation ID field allowing to associate the Calibration_Request feedback with the specific Serial_Number_ONU message. |
| 16 | DDDD WWWW | DDDD - target downstream wavelength channel<br>WWWW - target upstream wavelength channel |
| 17-40 | Padding | |
| 41-48 | MIC | Set to 0×00 by transmitter; treated as "don't care" by receiver. |

METHOD OF TUNING WAVELENGTH IN TIME AND WAVELENGTH DIVISION MULTIPLEXING-PASSIVE OPTICAL NETWORK (TWDM-PON)

CROSS-REFERENCE TO RELATED APPLICATION(S)

This application claims priority from Korean Patent Application Nos. 10-2014-0073146, filed on Jun. 16, 2014, 10-2014-0155482, filed on Nov. 10, 2014, and 10-2015-0082701, filed on Jun. 11, 2015, in the Korean Intellectual Property Office, the disclosures of which are incorporated herein by references in its entirety.

BACKGROUND

1. Field

The following description relates to a time and wavelength division multiplexing-passive optical network (TWDM-PON), and more particularly, to wavelength tuning procedures when the TWDM-PON adds an operating channel.

2. Description of the Related Art

A passive optical network (PON) is a subscriber network that connects a central office and a subscriber with a point-to-multipoint topology and is cost effective compared to a structure having a point-to-point topology since required central office systems and optical cables can be reduced.

A time division multiplexing-passive optical network (TDM-PON), for example, Ethernet PON and Gigabit-Capable PON (GPON), uses one wavelength for upstream traffic and another wavelength for downstream traffic to connect a central office to subscribers, and is characterized by its use of, especially, an optical splitter which does not require power to establish a connection between the central office and the subscribers. Thanks to such characteristics, TDM-PON has been distributed worldwide and established successfully. Particularly, GPON networks have been established across the globe, especially in Northern America and Europe. In 2010, the International Telecommunication Union Telecommunication Standardization Sector (ITU-T) completed recommendation of G.987 XG-PON standard (10G-GPON). Recently, early commercial products based on the G.987 are being released. Furthermore, the Full Service Access Network (FSAN) Group, which is a standardization group consisting of major communication operators and equipment manufacturers associated with optical subscriber network technology, adopted a time and wavelength division multiplexing passive optical network (TWDM-PON), which is a hybrid type passive optical network that uses time division multiplexing and wavelength division multiplexing at the same time, as major technology of a next-generation passive optical network (NG-PON2). Therefore, the ITU-T is discussing recommendation for G.ngpon2.x standards.

FIG. 1 is a diagram illustrating an optical subscriber network that can accommodate a plurality of different services, for example, TDM-PON (corresponding to GPON OLT and XGPON OLT in FIG. 1), p-to-p (corresponding to OTDR in FIG. 1), RF vide overlay (corresponding to RF VIDEO HE in FIG. 1), and the like. In the system configuration of FIG. 1, NG-PON2 (corresponding to NG-PON2 OLT port-1, . . . , and NG-PON2 OLT port-n in FIG. 1) is a hybrid network that uses TDM and WDM schemes. NG-PON2 with a structure capable of accommodating a plurality of homogeneous or heterogeneous service links using a plurality of optical signals of different wavelengths can advantageously increase the transmission capabilities in proportion to the number of optical wavelength channels, without changing a splitter used in the existing TDM network.

Referring to FIG. 1, a TWDM-PON network represented as NG-PON2 is a hybrid passive optical subscriber network that accommodates a central office system, including n optical line terminals (OLTs) that use different wavelengths. Under the assumption that each central office system accommodates one PON link, one optical distribution network accommodates n homogeneous or heterogeneous networks, and services are distinguished from each other by a wavelength band of a signal used. In this case, TWDM-PON optical network unit (ONU) (NG-PON2 ONU) receives wavelength-multiplexed downstream optical signals from a plurality of TWDM-PON OLTs. To communicate with a particular TWDM-PON OLT, the TWDM-PON ONU should be able to select a wavelength of an upstream signal corresponding to the particular TWDM-PON OLT. Thus, the ONU needs to be equipped with a wavelength-selectable transceiver, that is, a tunable transceiver. The tunable transceiver includes a tunable laser and a tunable receiver.

FIG. 2 is a conceptual diagram of TWDM-PON as a main technology of the next-generation passive optical subscriber network. In FIG. 2, it is assumed that there are n OLTs using different wavelengths, and each OLT accommodates one PON link. A single splitter accommodates n TDW-PON networks, and TDM-PON links are distinguished from each other by a different wavelength used.

In the system of FIG. 2, one or more ONUs that use the same wavelength ($\lambda d1$ for downstream transmission, $\lambda u1$ for upstream transmission), for example, ONU A communicates with OLT #1 that uses the same wavelength, and in similar manner, ONU B may be connected to OLT #2. An upstream signal is transmitted to an OLT using a wavelength that matches a downstream signal chosen by the ONU or a wavelength indicated by wavelength allocation information received from the OLT, and upstream signals transmitted from a plurality of ONUs are separated by wavelength by a demultiplexer, and resultant signals are transmitted to corresponding OLTs.

By contrast, since a downstream signal is multiplexed by a wavelength-multiplexer, each ONU receives all downstream wavelengths, and each ONU utilizes only a downstream signal of a particular wavelength chosen from the received all downstream wavelengths. To this end, each ONU needs to select a wavelength of a downstream signal and a tunable receiver has to be synchronized with the downstream signal of the selected wavelength. Efforts to standardize a process of tuning a wavelength in an ONU is now under way in the international standard ITU-T G.989.3, in which an ONU may receive a downstream signal through synchronization of a selected arbitrary downstream signal and may be activated based on the received downstream signal so as to connect and communicate with an OLT.

In TWDM-PON system, it is possible to increase or decrease the number of currently operating channels, that is, the number of pairs of downstream wavelength and upstream wavelength for channel load balancing or efficient system management. For example, the TWDM-PON may use all four channels when there are many service users, but when the number of service users decreases or the needed traffic capacity is reduced, it may be possible to reduce the number of channels in use for efficient system operation.

FIG. 3 is a diagram schematically illustrating a relevant scenario. Referring to FIG. 3, at normal stage, a service is provided through downstream wavelengths λ1, λ2, λ3, . . . , and λn of all channels, while at power saving stage, downstream wavelengths λ2, μ3, . . . , and λn of some channels stop being used, and the service is provided through only the downstream wavelength λ1 of the remaining channel. Therefore, by shutting the power to the optical transceivers of OLTs (corresponding to NG-PON2 OLT Port-2, NG-PON2 OLT2 OLT Port-3, . . . , and NG-PON2 OLT Port-n in FIG. 3) for unused channels, the power consumption by the system can be reduced.

In another example, the TWDM-PON uses only some channels in an initial stage, but if there is an increase in the number of service subscribers or in traffic, channels to be used may be added to guarantee the quality of services. That is, in order to reduce system operation costs, communication service providers that provide Internet services using the TWDM-PON may use only one channel in the initial stage, and may gradually increase the number of operating channels. FIG. 4 is a diagram schematically illustrating a relevant scenario. Referring to FIG. 4, a service is provided through one downstream wavelength channel (λ1) in the initial stage, through two downstream wavelength channels (λ1 and λ2) in the intermediate stage, and through all the downstream wavelength channels (λ1, λ2, λ3, . . . , λn) in the final stage.

However, as can be seen in the initial stage or in the intermediate stage, an ONU that is newly activated in the TWDM-PON that uses only some of the operating channels may identify and store only the downstream wavelength channels that are currently used. Further, the ONU transmits an upstream signal to an OLT using an upstream wavelength that corresponds to the identified downstream wavelength. Then, in the case where there is an increase in the number of subscribers or in traffic, the OLT increases the number of channels used to provide services, and transmits a command or request of wavelength change or wavelength tuning to some or all the ONUs to change previous channels to newly added channels.

FIG. 5 is a diagram partially illustrating an example of wavelength tuning which is described in ITU-T G. 989.3, more specifically G. 989. 3 (Title: Draft new recommendation ITU-T G. 989.3 (for Consent, 4 Apr. 2014)) that is currently in the process of being standardized by ITU-T Study Group 15. The example of wavelength tuning illustrated in FIG. 5 is the case of changing a channel, in which a channel of ONU1 is changed from a first channel (λ1$d$, $u$) allocated to an OLT-port 1 to a second channel (λ2$d$, $u$) allocated to an OLT-port 2. Referring to FIG. 5, an OLT, more specifically the OLT-port 1, transmits a wavelength-tuning request message, e.g., a Tuning_Control (Request) PLOAM message, to an ONU1 to change a channel to the second channel (λ2$d$, $u$) in S10. The second channel (λ2$d$, $u$) is a newly added operating channel after the ONU1 has been activated in the TWDM-PON.

Once the ONU1 receives the request message through the downstream wavelength (λ1$d$) of the first channel (λ1$d$, $u$), the ONU1 determines whether a wavelength may be changed, and transmits a response message that includes a determination result to the OLT-port 1 through the upstream wavelength (λ1$u$) of the first channel (λ1$d$, $u$). Generally, in the case where the ONU1 may change a wavelength in response to a wavelength change request, the ONU1 transmits an ACK message, e.g., a Tuning_Response (ACK) PLOAM message, which indicates that a wavelength is tunable, and in the case where the ONU1 may not change a wavelength, the ONU1 transmits an NACK message, e.g., a Tuning_Response (NACK) PLOAM message, which indicates that wavelength is not tunable. However, in the above case, the ONU1 that receives a channel change request has no choice but to transmit an NACK message, e.g., a Tuning_Response (NACK) PLOAM message, to the OLT-port 1 in S11. The reason is that the ONU1 has identified and stored information on the downstream wavelengths of channels used when the ONU1 has been activated to establish a link through the first channel (λ1$d$, $u$), but has no information on a downstream wavelength of a newly added channel, i.e., the second channel (λ2$d$, $u$). As a result, in the case where the number of channels used in the system is increased, an ONU may not change a previously used channel to a newly added channel by using the general wavelength tuning process.

SUMMARY

The following description relates to wavelength tuning procedures whereby an optical network unit (ONU) can tune itself to a new channel when the new channel of a downstream wavelength that is different from downstream wavelengths that the ONU has recognized and recorded thereon during the earlier activations is additionally operated in a system capable of operating multiple channels, such as a time and wavelength division multiplexing-passive optical network (TWDM-PON) system.

In one general aspect, there is provided a method of tuning a wavelength in a TWDM-PON having a plurality of operable channels, the method including operations of: (a) after a second channel is added as an operating channel of the TWDM-PON in which at least a first channel is working, sending a wavelength tuning request message from an optical line terminal (OLT), which is providing a service to an ONU through the first channel, to request the ONU to change from the first channel to the second channel; (b) in response to receiving the wavelength tuning request message, determining, at the ONU, whether or not a downstream wavelength of the second channel has been recorded on the ONU; and (c) in response to a determination that the downstream wavelength of the second channel is recorded on the ONU, sending to the OLT an ACK message that indicates that the ONU is able to perform wavelength tuning, and then commencing wavelength tuning to the second channel, and in response to a determination that the downstream wavelength of the second channel is not recorded on the ONU, sending to the OLT a NACK message that indicates that the ONU is unable to perform wavelength tuning.

The NACK message may include NACK code that indicates a specific cause of the ONU being unable to perform wavelength tuning.

The NACK code may indicate one of the following: "NACK by not ready yet," "NACK by out of supported TX tuning range," "NACK by out of supported RX tuning range," "NACK by out of both supported TX and RX tuning range," and "NACK by lacking wavelength channel calibration information."

The wavelength tuning request message may include new indication code that indicates whether the second channel is to be newly added as an operating channel.

The method may further include, prior to the operation (c), operations of: (d) in response to a determination in (b) that the downstream wavelength of the second channel is not recorded, scanning, at the ONU, downstream wavelengths while varying a receiving wavelength of a tunable receiver; and (e) recording, at the ONU, a found downstream wavelength.

The method may further include, prior to the operation (a), operations of: (f) sending, from the OLT, a wavelength re-scanning request message to the ONU to request the ONU to re-scan downstream wavelengths; and (g) sending, from the ONU that has completed downstream wavelength re-scanning in response to the wavelength re-scanning request message, a message (hereinafter, referred to as a "wavelength re-scanning completion message") to the OLT to notify of completion of wavelength re-scanning.

The method may further include, after the operation (c), operations of: (h) in response to receiving the NACK message, sending, from the OLT, a wavelength re-scanning request message to the ONU; (i) sending, from the ONU that has completed downstream wavelength re-scanning in response to the wavelength re-scanning request message, a wavelength re-scanning completion message to the OLT; and (j) in response to receiving the wavelength re-scanning completion message, re-sending a wavelength tuning request message from the OLT to the ONU to request the ONU to change to the second channel. The method may further include, prior to the operation (h), (k) in response to receiving the NACK message, sending, from the OLT, a wavelength information request message to the ONU to request the ONU to send wavelength information that is recorded on the ONU; and (l) in response to the wavelength information request message, sending, from the OLT, a wavelength information response message that carries wavelength information that is recorded on the ONU to the OLT.

The method may further include, prior to the operation (c), operations of: (m) in response to receiving the NACK message, sending, from the OLT, a reactivation request message to the ONU to request the ONU to perform again a reactivation operation; (n) in response to receiving the reactivation request message, sending, from the ONU, a reactivation completion message to the OLT to notify of completion of reactivation; and (o) in response to receiving the activation completion message, sending again, from the OLT, the wavelength tuning request message to the ONU to request the ONU to change to the second channel. In this case, the method may further include, prior to the operation (m), operations of: (p) in response to receiving the NACK message, sending, from the OLT, a wavelength information request message to the ONU to request the ONU to send wavelength information that is recorded on the ONU; and (q) in response to the wavelength information request message, sending, from the OLT, a wavelength information response message that carries wavelength information that is recorded on the ONU to the OLT.

Other features and aspects will be apparent from the following detailed description, the drawings, and the claims.

BRIEF DESCRIPTION OF THE DRAWINGS

FIG. 7 is a table showing a configuration of a Tuning_Response(NACK) PLOAM message which is used as a NACK message.

FIG. 8 is a table showing a configuration of a Tuning_Control(Request) PLOAM message which is used as a wavelength tuning request message.

FIG. 13 is a table showing a configuration of a calibration request PLOAM message which is used as a wavelength scan request message.

Figure 1:
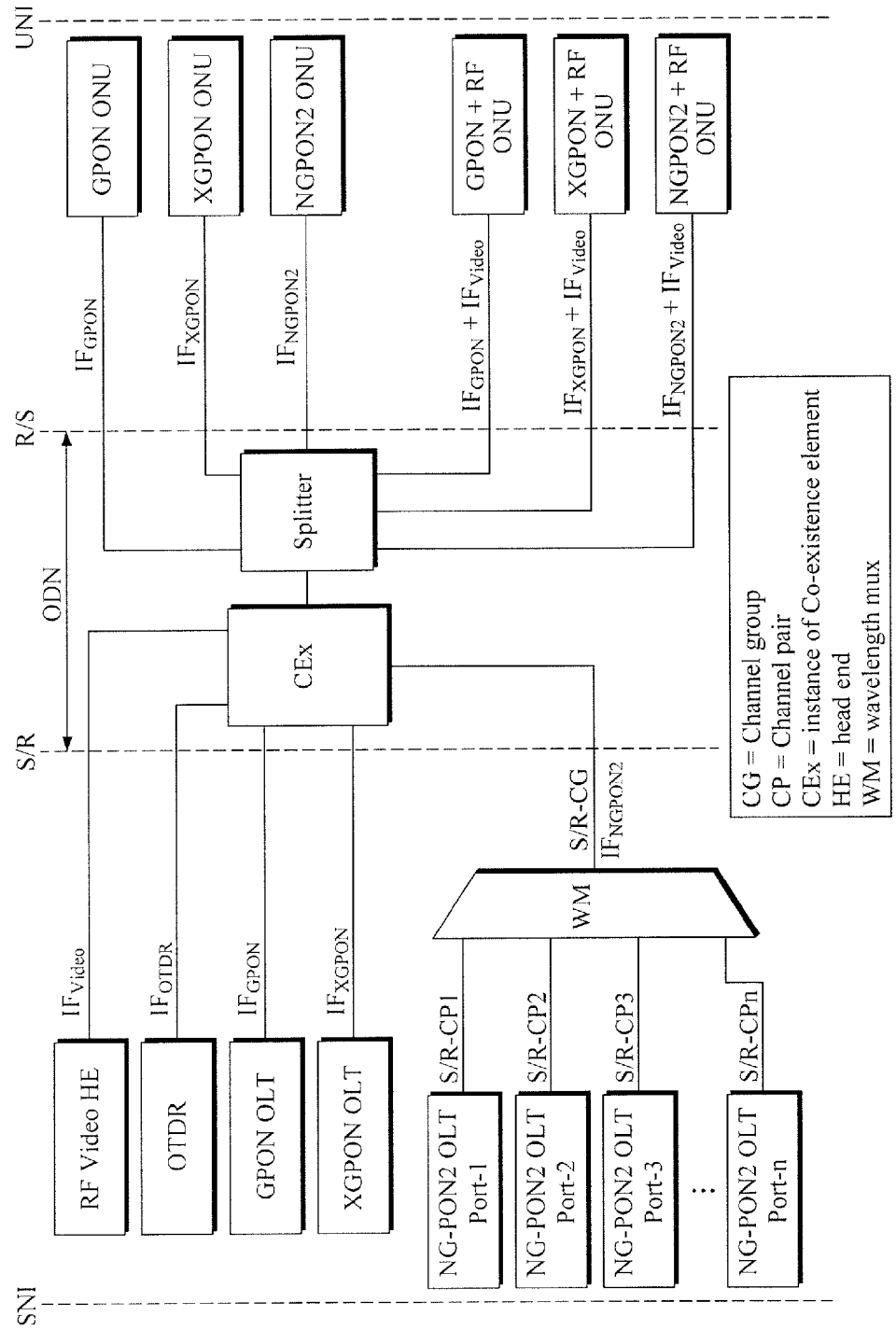
FIG. 1 is a diagram illustrating an optical subscriber network that can accommodate a plurality of different services by applying wavelength multiplexing scheme to an existing passive optical subscriber network.
Figure 2:
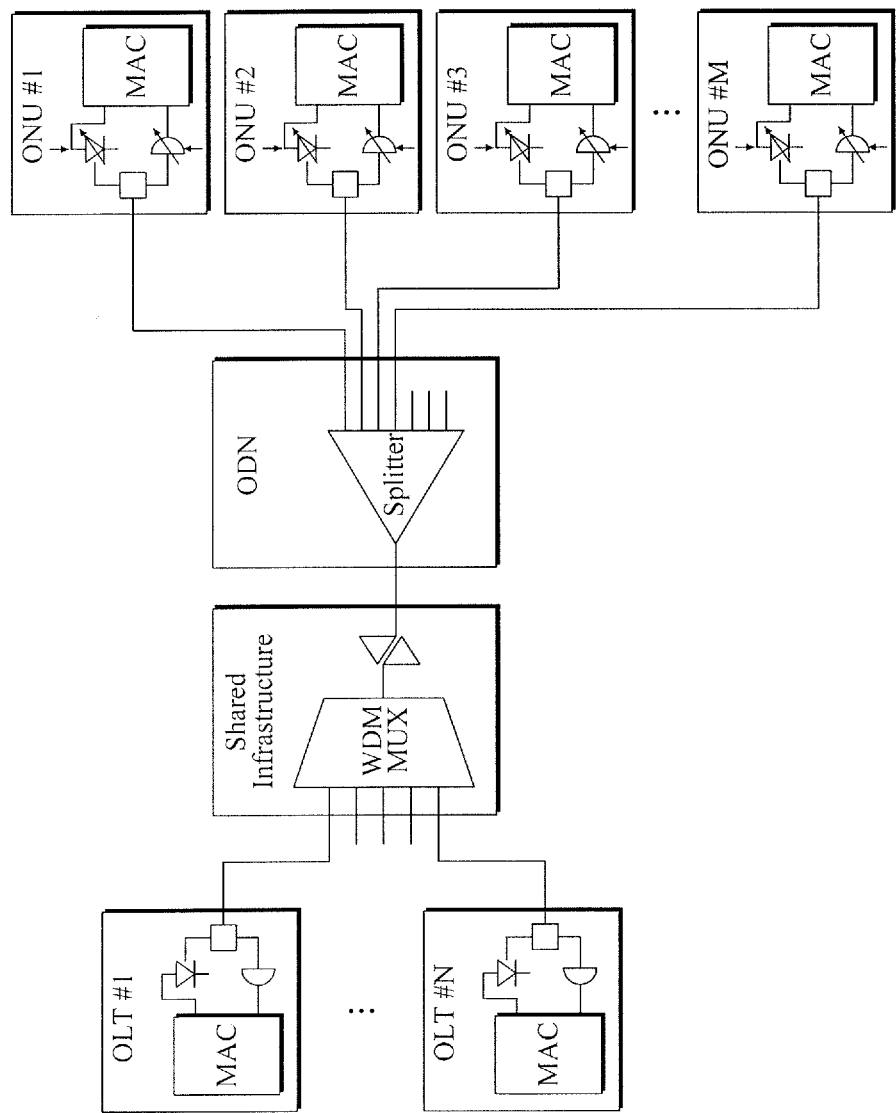
FIG. 2 is a diagram illustrating a time wavelength division multiplexing-passive optical network (TWDM-PON) system.
Figure 3:
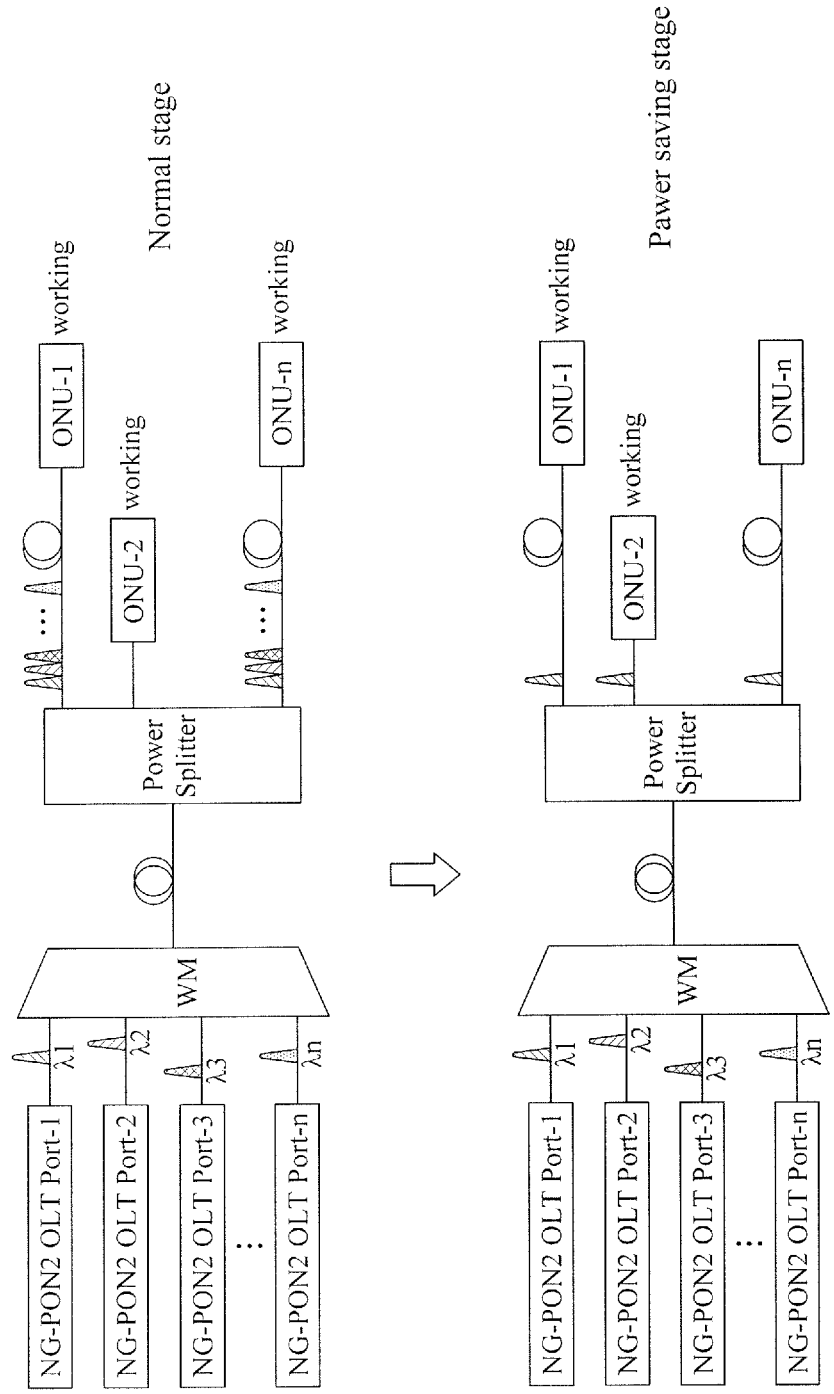
FIG. 3 is a diagram illustrating an example of a scenario of reducing the number of channels used in a TWDM-PON system over time.
Figure 4:
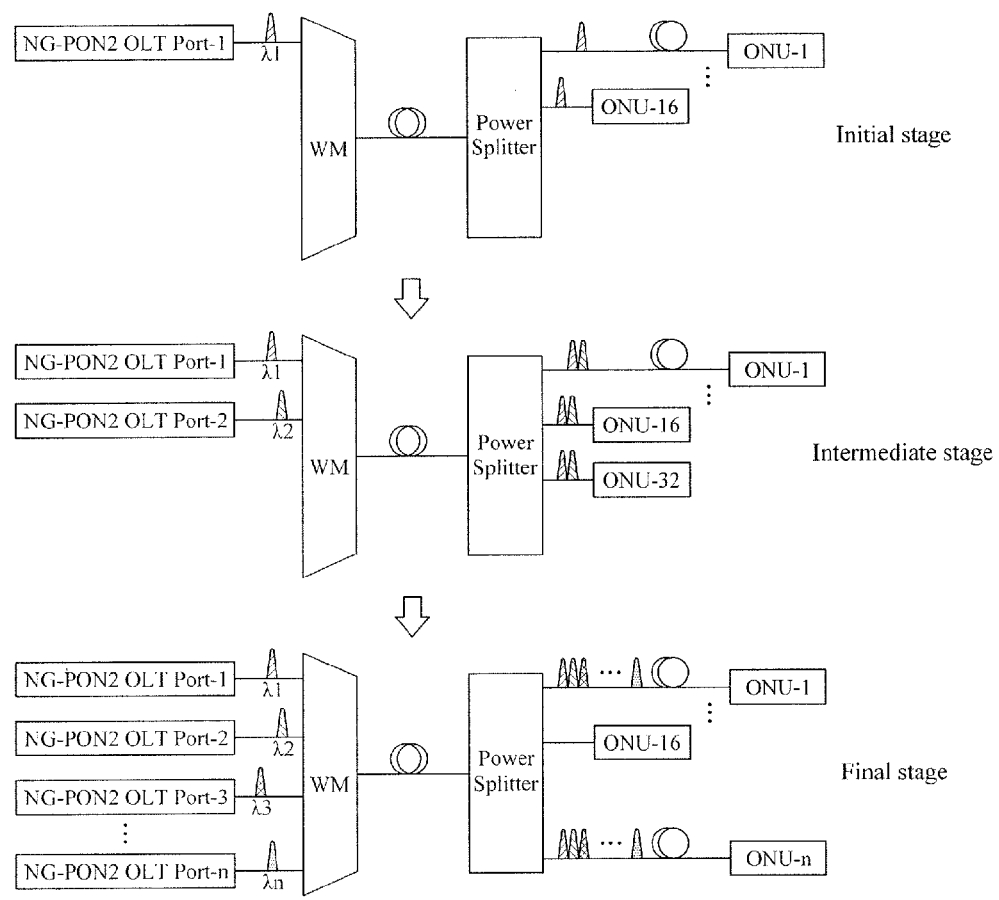
FIG. 4 is a diagram illustrating an example of a scenario of increasing the number of channels used in a TWDM-PON system over time.
Figure 5:
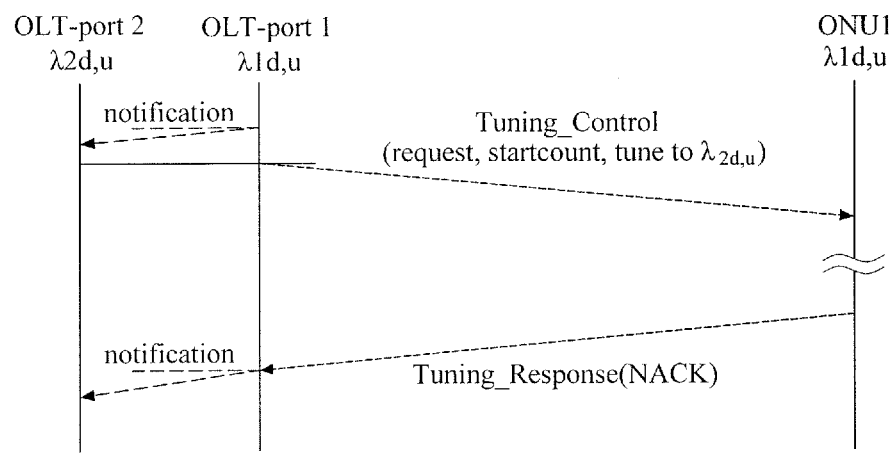
FIG. 5 is a diagram partially illustrating an example of wavelength tuning process of the scenario of FIG. 4.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The exemplary embodiments now will be described more fully hereinafter with reference to the accompanying figures. In the following description, a detailed description of known functions and configurations incorporated herein will be omitted when it may obscure the subject matter with unnecessary detail. Terms used throughout this specification are defined in consideration of functions according to exemplary embodiments, and can be varied according to a purpose of a user or manager, or precedent and so on. Therefore, definitions of the terms should be made on the basis of the overall context.

Figure 6:
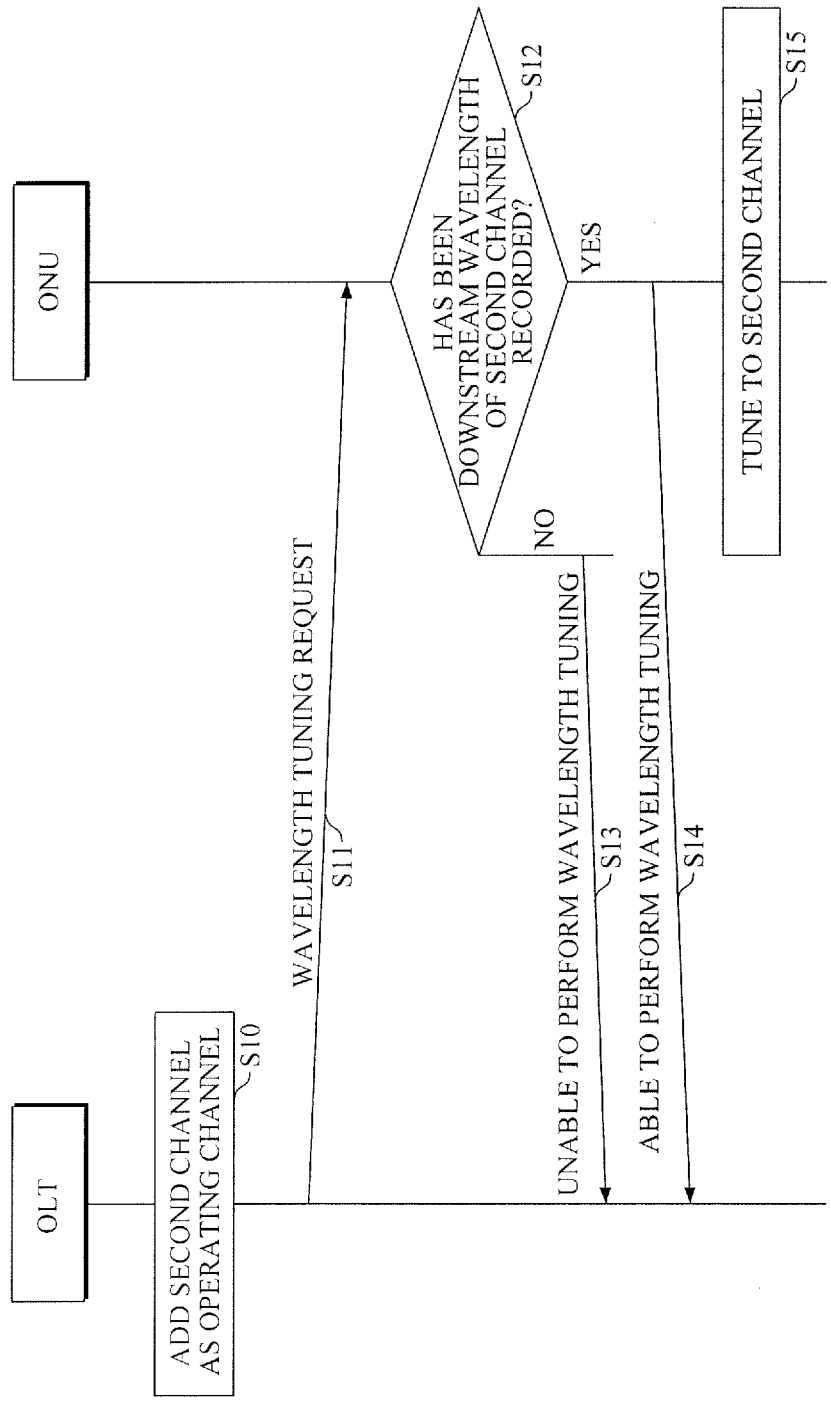
FIG. 6 is a flowchart illustrating wavelength tuning procedures of a time and wavelength division multiplexing-passive optical network (TWDM-PON) according to an exemplary embodiment.

FIG. 6 is a flowchart illustrating wavelength tuning procedures of a time and wavelength division multiplexing-passive optical network (TWDM-PON) according to an exemplary embodiment. In FIG. 6, at least a first channel is operated, but a second channel is not operated among a plurality of operable channels of the TWDM. Under this situation, an optical network unit (ONU) connected to a PON is activated, and, in the process of activation, the ONU scans downstream wavelengths of all channels currently operated in the TWDM-PON. Thus, by scanning the wavelengths, the ONU can recognize and make a record of downstream wavelengths of all operating channels, including the first channel. However, in this case, the ONU is not able to recognize downstream wavelengths of the non-operating channels, including the second channel, and, accordingly, does not have a record of the downstream wavelengths of the non-operating channels.

Referring to FIG. 6, the second channel is added as an operating channel of the TWDM-PON that is operating the first channel in S10. In the exemplary embodiment, the second channel can be added as the operating channel for any reasons. For example, when the number of subscribers increases and/or the traffic demand increases, one or more channels serviced by an optical line terminal (OLT) may be added to the TWDM-PON. To add a new channel, the OLT may install a new line card or supply a power to an optical transceiver of a channel that has been previously installed, but not been used.

In addition, the OLT sends a wavelength tuning request message to the ONU to request the ONU to change its channel from the first channel to the newly added second channel in S11. For example, the wavelength tuning request message may be a Tuning_Control(Request) Physical Layer Operation Administration and Management (PLOAM) message, which is described in Draft new Recommendation ITU-T G. 989.3 (for Consent, 4 Apr. 2014) that is currently in the process of being standardized by ITU-T Study Group 15. The wavelength tuning request message may carry information for identifying a target channel, i.e., the second channel. In addition, an ONU-ID contained in the wavelength tuning request message may specify a particular ONU to which the message is directed.

In S12, in response to receiving the wavelength tuning request message from the OLT, the ONU determines whether or not downstream wavelength of the second channel has been recorded on the ONU itself. Generally, the ONU keeps a record of downstream wavelengths that have been recognized during the earlier activations, and thus, in this case, the ONU does not have a record of the downstream wavelength of the channel newly added to the TWDM-PON. Therefore, the ONU confirms that the downstream wavelength of the second channel is not recorded thereon, and then the ONU sends a NACK message that informs the OLT that the ONU is unable to perform wavelength tuning, as depicted in S13. The NACK message may be a Tuning_Response(NACK) PLOAM message that is specified in the aforementioned G989.3 draft.

In some circumstances, however, the ONU may re-scan downstream wavelengths of channels operated in the TWDM-PON after the second channel is added as an operating channel. For example, the ONU may re-scan the downstream wavelengths in response to an explicit request from the OLT for re-scanning, or may re-scan the downstream wavelengths while being reactivated in response to a reactivation request from the OLT. The OLT may issue the request for re-scanning or the reactivation request after S10 in which the addition of an operating channel is performed, or after the OLT receives the NACK message sent in S13. In another example, the ONU may re-scan the downstream wavelength periodically or irregularly according to its internal algorithm, or when the ONU determines that the downstream wavelength of the second channel has been recorded in S12, the ONU may re-scan the downstream wavelengths without sending the NACK message as depicted in S13. Examples of re-scanning on downstream wavelengths will be described below.

When the ONU determines that the downstream wavelength of the second channel is recorded thereon, the ONU sends to the OLT an ACK message that informs the OLT that the ONU is able to perform wavelength tuning, as depicted in S14. The ACK message may be a Tuning_Response (ACK) PLOAM message described in G989.3 draft. In S15, the ONU initiates a wavelength tuning process to change its wavelength to the second channel according to specific procedures (e.g., procedures described in the aforementioned G989.3 draft).

In one aspect, the NACK message sent from the ONU to the OLT may comprise information that indicates the cause of being unable to perform wavelength tuning. For example, the NACK message may contain NACK code. Because wavelength information recorded on the ONU does not contain information on a wavelength of the target channel to which the OLT requests the ONU to tune, the NACK message that is sent in S13 may carry NACK code to indicate that the ONU is unable to perform wavelength tuning. For example, the NACK message may contain NACK code of "NACK by lacking calibration information."

FIG. 7 is a table showing a configuration of a Tuning_Response(NACK) PLOAM message which is used as a NACK message. Referring to FIG. 7, the Tuning_Response (NACK) PLOAM message comprises an ONU-ID field (octet 1-2), a message type field (octet 3), a sequence number field (octet 4), an operation code field (octet 5), a response code field (octet 6), a wavelength tuning result field (octet 7), a destination wavelength field (octet 8), a padding field (octet 9-40), and an MIC field (octet 41-48).

The Tuning Response(NACK) PLOAM message of FIG. 7 is different from an existing Tuning_Response(NACK) PLOAM message (refer to Draft new Recommendation ITU-T G.989.3) in that its response code field (octet 6) contains NACK code to indicate a specific cause of the ONU being unable to perform wavelength tuning. More specifically, the NACK code may indicate one of the followings: "NACK by not ready yet," "NACK by out of supported TX tuning range," "NACK by out of supported RX tuning range," "NACK by out of both supported TX and RX tuning range," and "NACK by lacking wavelength channel calibration information."

In another aspect, the wavelength tuning request message sent from the OLT to the ONU as depicted in S11 may carry information on the wavelength newly added in S10. As described above, the wavelength tuning request message carries information for identifying a target channel, i.e., the second channel. In addition, the wavelength tuning request message may contain information that indicates whether the second channel is to be newly added as an operating channel, and, for example, new indication code. The new indication code may have a value consisting of predetermined bits or bytes.

FIG. 8 is a table showing a configuration of a Tuning_Control(Request) PLOAM message which is used as a wavelength tuning request message. Referring to FIG. 8, the Tuning_Control(Request) PLOAM message consists of ONU-ID field (octet 1-2), a message type field (octet 3), a sequence number field (octet 4), an operation code field (octet 5), a superframe count field (octet 7-8), a rollback field (octet 9), a target downstream wavelength field (octet 10-12), a target upstream wavelength field (octet 13-15), a new indication code field (octet 16), a padding field (octet 17-40), and a message integrity check (MIC) field (octet 41-48).

The Tuning_Control(Request) PLOAM message of FIG. 8 is different from an existing Tuning_Control(Request) PLOAM message (refer to Draft new Recommendation ITU-T G.989.3) in that the message of FIG. 8 contains the new indication code. More specifically, the new indication code may indicate a request for normal channel tuning or a request for tuning to the target channel after calibration of the target channel (shown as "calibrate the target channel first and tune to the target channel" in FIG. 8). In the case where the new indication code indicates the request for normal channel tuning, the ONU sends a NACK message to the OLT, when the downstream wavelength of the second channel has not been recorded in the ONU, as depicted in S13. Or in the case where the new indication code indicates the request for tuning to the target wavelength after the calibration of the target wavelength, the ONU may scan the downstream wavelengths first and then perform operations following operation S12. The new indication code is only exemplary, and it may be represented as a value of various forms in different examples.

Examples of a wavelength tuning method according to the exemplary embodiment illustrated in FIG. 6 will be described. Therefore, descriptions provided with reference to FIG. 6 may be applied to descriptions which will be omitted hereinafter.

Figure 9:
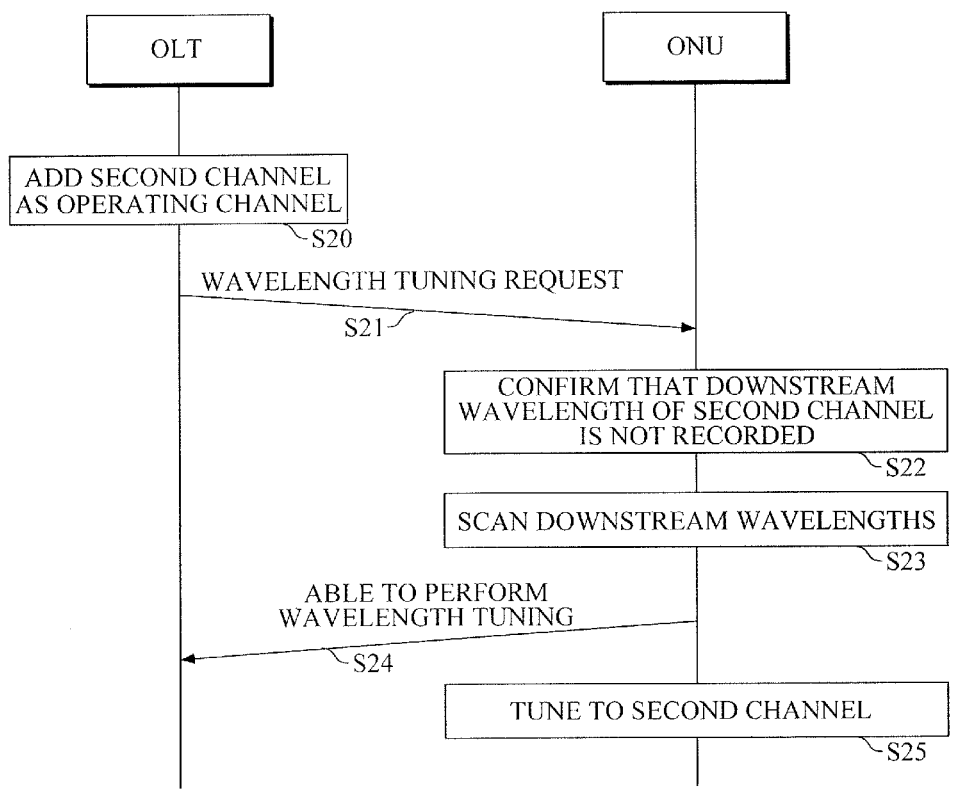
FIG. 9 is a flowchart illustrating a first example of a wavelength tuning method.

FIG. 9 is a flowchart illustrating a first example of a wavelength tuning method. The example illustrated in FIG. 9 is a case where information on a downstream wavelength of a second channel that is newly added as an operating channel is not recorded on an ONU, and in this case, the ONU autonomously re-scan downstream wavelengths.

Referring to FIG. 9, in S20, the second channel is added as an operating channel of the TWDM-PON in which at least a first channel is working. Then, in S21, OLT sends to the ONU a wavelength tuning request message to request the ONU to change from the first channel to the second channel newly added. In S22, in response to receiving the wavelength tuning request message from the OLT, the ONU determines whether the downstream wavelength of the second channel is recorded on the ONU itself and confirms that the downstream wavelength of the second channel is not recorded, as depicted in S22.

In S23, the ONU re-scans downstream wavelengths while calibrating a wavelength of its tunable receiver. During re-scanning downstream wavelengths, the ONU searches for and attempts physical synchronization to a downstream signal and records a wavelength of the found downstream signal. If a downstream wavelength of the second channel is found in the re-scanning process of S23, the ONU responds to the OLT by sending an ACK message. In S25, the ONU initiates a wavelength tuning process to change its wavelength to the second channel according to specific procedures (e.g., procedures described in the aforementioned G989.3 draft). Although not illustrated, if the ONU fails to find the downstream wavelength of the second channel during the wavelength re-scanning in S23, the ONU responds to the OLT by sending a NACK message.

Figure 10:
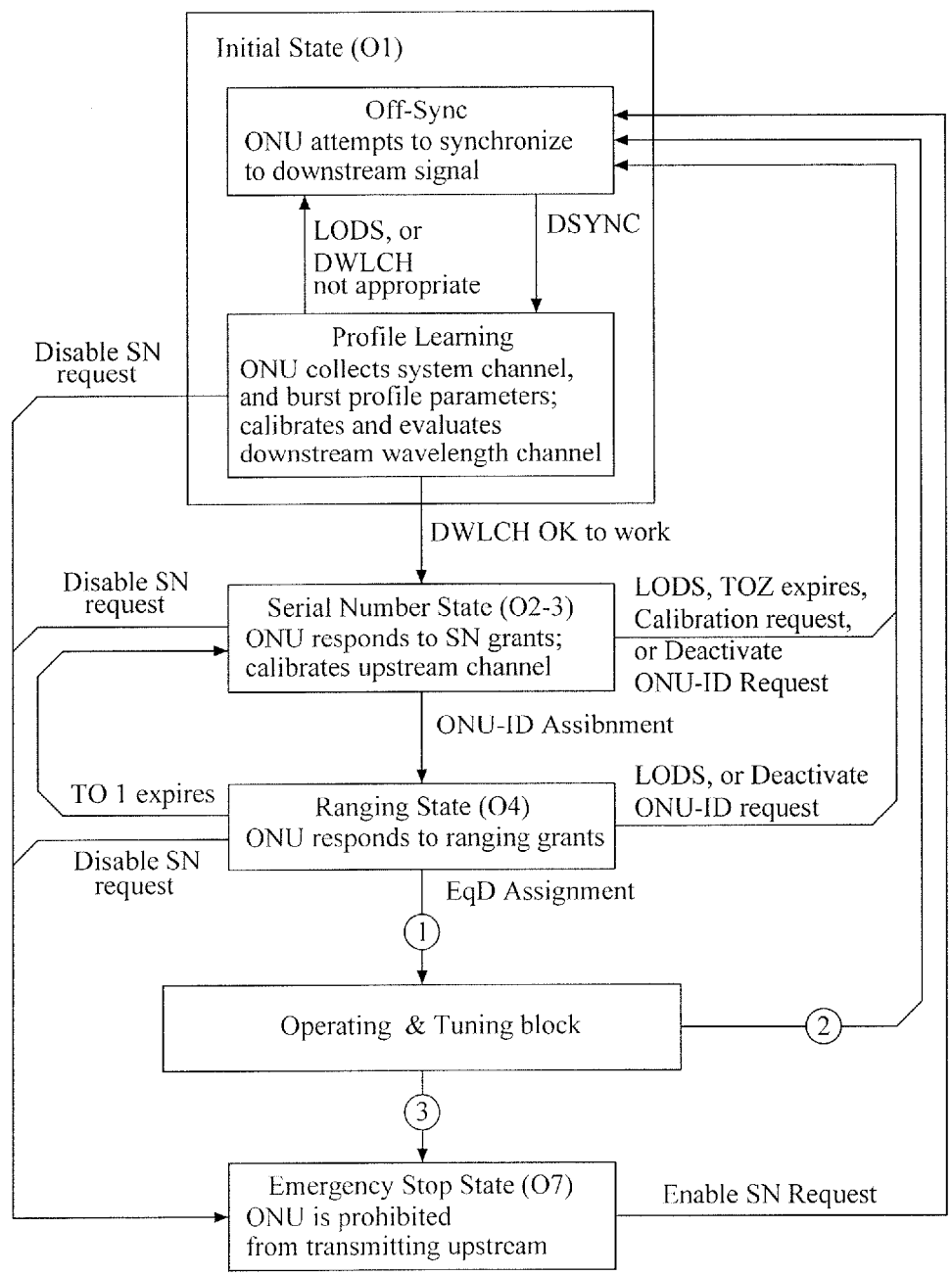
FIG. 10 is an ONU state diagram showing ONU activation process, including the operating and tuning block.

In this example, the ONU scans downstream wavelengths in S23, which may be performed in the operating and tuning block of an ONU activation process that is discussed in G.989.3. FIG. 10 is an ONU state diagram showing ONU activation process, including the operating and tuning block.

Figure 11:
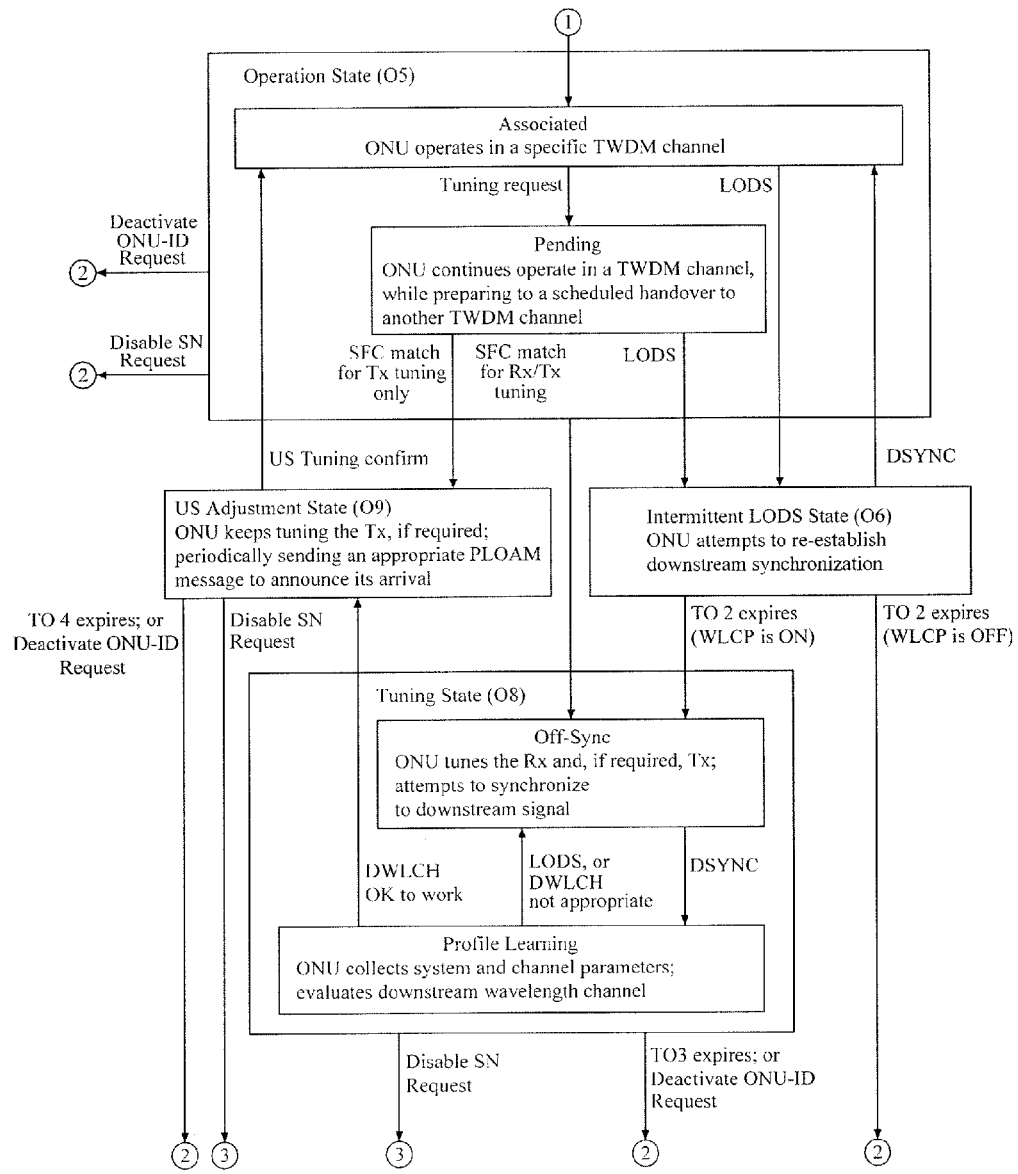
FIG. 11 is a diagram explaining a process of downstream wavelength scanning.

In another example, the ONU may scan downstream wavelengths in an operation state (O5) in the ONU activation process that is described in draft G989.3. FIG. 11 is a diagram explaining a process of downstream wavelength scanning by the ONU in the Operation state (O5), and the diagram of FIG. 11 and the state diagram of FIG. 10 are connected to each other through ①, ②, and ③.

Referring to FIG. 11, when the ONU in the Operation state receives a wavelength tuning request, it enters into Pending state. If the superframe counter match event occurs within a short period of time, the ONU enters into the Tuning state (O8) and then performs physical synchronization and profile learning.

On the contrary, if the wavelength tuning takes a significant amount of time, then it indicates that loss of downstream synchronization (LODS) occurs in the ONU, and hence the ONU enters into the Intermittent LODS state (O6). If the synchronization to the downstream signal has not been performed even when the ONU enters into the Intermittent LODS state (O6) and a value of timer TO2 expires, the ONU returns to the Initial state (O1) (refer to FIG. 10). That is, the entire activation procedures are performed again.

To avoid such transition to the Initial state, knowledge about a time taken to perform wavelength tuning of a tunable transceiver of the ONU in the Intermittent LODS state (O6) needs to be achieved in advance, and a wait operation is needed for this period of time. The wavelength tuning time of a tunable transceiver of the ONU is classified into Class 1, Class 2, and Class 3 which are defined according to G.989.3. Time durations corresponding to these classes, i.e., classes of Tx/Rx wavelength channel tuning times are shown below in Table 1.

TABLE 1

| Class 1 | <10 µs |
| Class 2 | 10 µs to 25 ms |
| Class 3 | 25 ms to 1 s |

In the case of Class 1, the ONU enters into the Tuning state (O8). In the case of Class 2 or Class 3, superframe counter matching conditions are not satisfied, and thus the ONU enters into the Intermittent LODS state (O6). In this case, the timer TO2 that is used in the Intermittent LODS state (O6) is determined by taking into consideration the class of tuning time of the tunable transceiver of the ONU. In addition, the ONU recognizes the class of tuning time of the tunable transceiver and can adjust the timer TO2 in accordance with the recognized class. Alternatively, it may be possible to set a new timer other than the existing timer TO2.

The use of the class of tuning time may apply to the operations described with reference to FIG. 10 and the operations in the operating and tuning block. More specifically, the OLT and the ONU may mutually recognize the class of tuning time and take into consideration the recognized class when performing the operations in the operating and tuning block. In this case, for the OLT and the ONU to mutually recognize the class of tuning time, they may exchange information by sending specific messages, for example, PLOAM messages to each other.

In the exemplary embodiment illustrated in FIG. 9, while the ONU is scanning the downstream wavelengths as depicted in S23, a service provided through the first channel may be disconnected. That is, transmission of a data packet, i.e., an upstream signal, to the OLT is not enabled due to the scanning of the downstream wavelengths, so that a service delay may occur. To prevent the service delay, the ONU may have a memory of adequate size. Alternatively, the ONU may sequentially scan some wavelengths at a given time interval, rather than scanning all wavelengths at one time, so that the service delay may be minimized.

The wavelength re-scanning process described in connection with the first example may apply to other examples where the ONU scans downstream wavelengths, which will be provided below.

Figure 12:
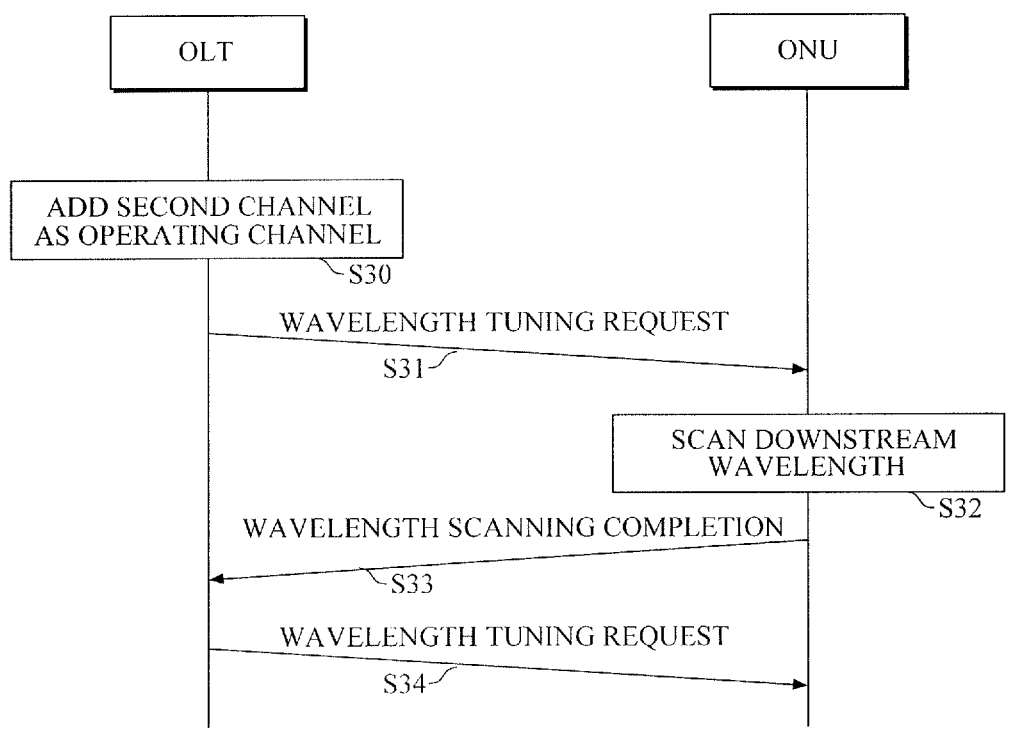
FIG. 12 is a flowchart illustrating a second example of the wavelength tuning method.

FIG. 12 is a flowchart illustrating a second example of the wavelength tuning method. The example illustrated in FIG. 12 is a case where when a new operating channel is added, an OLT sends a wavelength scan request first to the ONU before issuing a wavelength tuning request. In such a case, the ONU scans downstream wavelengths in response to the wavelength scanning request.

Referring to FIG. 12, a second channel is added as an operating channel of the TWDM-PON in which at least a first channel is working in S30. Then, the OLT sends a notification that the second channel is newly added as an operating channel, in addition to the first channel, and sends to the ONU a message, for example, a wavelength scan request message, to request the ONU to re-scan downstream wavelengths, as depicted in S31. Therefore, the wavelength scan request message carries information on the newly added channel (at least information on a downstream wavelength of the new channel).

The wavelength scan request message may be of a designated format, but the exemplary embodiments may not be limited thereto. In this example, as the wavelength scan request message, a PLOAM message that indicates re-scanning of wavelengths or carries information for such a purpose may be used. In addition, the wavelength scan request message may be sent to a specific ONU individually or be broadcast to all ONUs.

FIG. 13 is a table showing a configuration of a calibration request PLOAM message which is used as a wavelength scan request message. Referring to FIG. 13, the calibration request PLOAM message consists of an ONU-ID field (octet 1-2), a message type field (octet 3), a sequence number field (octet 4), an vendor-ID field (octet 5-8), a vendor serial number field (octet 9-12), an upstream wavelength channel ID field (octet 13), a correlation ID field (octet 14-15), a target downstream/upstream wavelength field (octet 16), a padding field (octet 17-40), and a message integrity check (MIC) field (octet 41-48).

Subsequently, the ONU that has received the wavelength scan request message from the OLT re-scans downstream wavelengths while varying the wavelength of a tunable receiver in S32. During the downstream wavelength re-scanning, the ONU searches for and attempts physical synchronization to a downstream signal and records a wavelength of the found downstream signal. Thereafter, the ONU responds to the OLT by sending a message (hereinafter, referred to as a "wavelength scan completion message") to notify of completion of wavelength scanning in S33. At this time, the ONU sends to the OLT the wavelength scan completion message using an upstream wavelength which was previously used for upstream communication. In addition, as the wavelength scan completion message, a PLOAM message that indicates the completion of wavelength re-scanning or carries information for such a purpose may be used.

Thereafter, the OLT that has received the wavelength scan completion message sends a wavelength tuning request message to the ONU in S34. The subsequent operations after S34 may be performed according to the operation S12 and following operations illustrated in FIG. 6.

Figure 14:
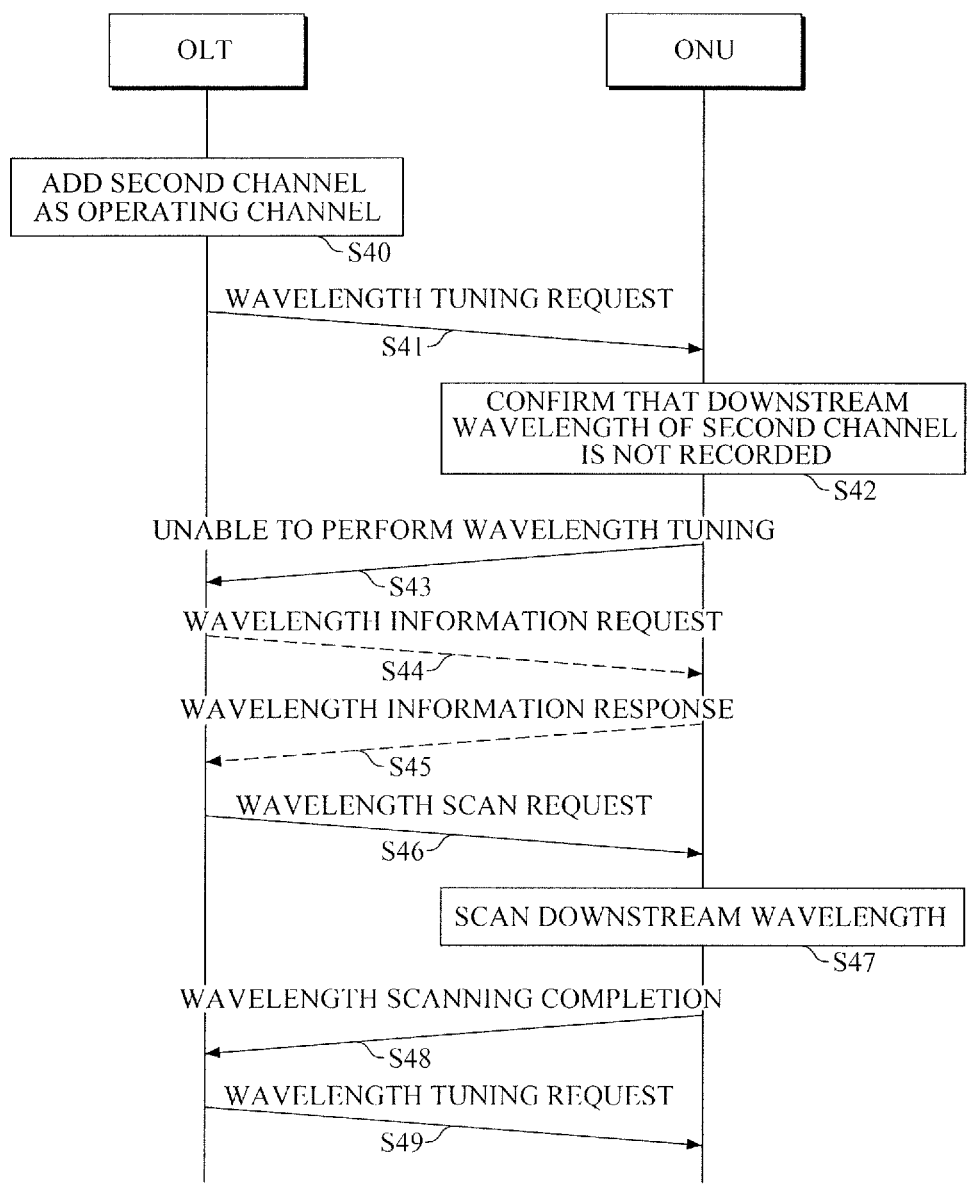
FIG. 14 is a flowchart illustrating a third example of the wavelength tuning method.

FIG. 14 is a flowchart illustrating a third example of the wavelength tuning method. The example illustrated in FIG. 14 is a case where the OLT issues a wavelength scan request to the ONU when the ONU has sent a NACK message in response to a wavelength tuning request message from the OLT. In this case, the ONU re-scans downstream wavelengths in response to the wavelengths can request from the OLT.

Referring to FIG. 14, in S40, a second channel is added as an operating channel of the TWDM-PON in which at least a first channel is working. Then, the OLT sends to the ONU a wavelength tuning request message to request the ONU to change from the first channel to the newly added second channel in S41. Then, the ONU that has received the wavelength tuning request message from the OLT determines whether a downstream wavelength of the second channel has been recorded on the ONU itself, and then confirms that the downstream wavelength is not recorded as depicted in S42. Thereafter, the ONU sends a NACK message to the OLT in S43.

In response to receiving the NACK message, the OLT sends to the ONU a message that requests the ONU to send wavelength information currently recorded thereon, e.g., a wavelength information request message in S44. As the wavelength information request message, a message that makes a request for wavelength information or a PLOAM message that carries information for such a purpose may be used. In response to the wavelength information request message, the ONU sends to the OLT a wavelength information response message that carries information on downstream wavelengths recorded on the ONU, as depicted in S45. As the wavelength information response message, a message of a specific format that carries information on the downstream wavelengths, e.g., a PLOAM message that contains such information may be used. Operations S44 and S45 are arbitrary and thus can be omitted.

The OLT compares the wavelength information sent from the ONU with information on wavelengths of channels through which the OLT itself provides services. If the comparison result shows that the two pieces of wavelength information do not match each other, the OLT sends a message to request the ONU to re-scan downstream signal wavelengths, e.g., a wavelength scan request message in S46. As the wavelength scan request message, a message of a specific format, e.g., a PLOAM message that indicates wavelength re-scanning or carries information for such a purpose may be used.

Subsequently, in S47, the ONU that has receiving the wavelength scan request message from the OLT re-scans the downstream wavelengths while varying a wavelength of the tunable receiver in S47. During the downstream wavelength re-scanning, the ONU searches for and attempts physical synchronization to a downstream signal and records a wavelength of the found downstream signal. Then, the ONU responds to the OLT by sending a wavelength scan completion message in S48. At this time, the ONU sends to the OLT the wavelength scan completion message using an upstream wavelength which was previously used for upstream communication. In addition, as the wavelength scan completion message, a PLOAM message that indicates the completion of wavelength re-scanning or carries information for such a purpose may be used. The OLT that has received the wavelength scan completion message sends a wavelength tuning request message to the ONU in S49. The subsequent operations after S49 may be performed according to the operation S12 and following operations illustrated in FIG. 6.

Figure 15:
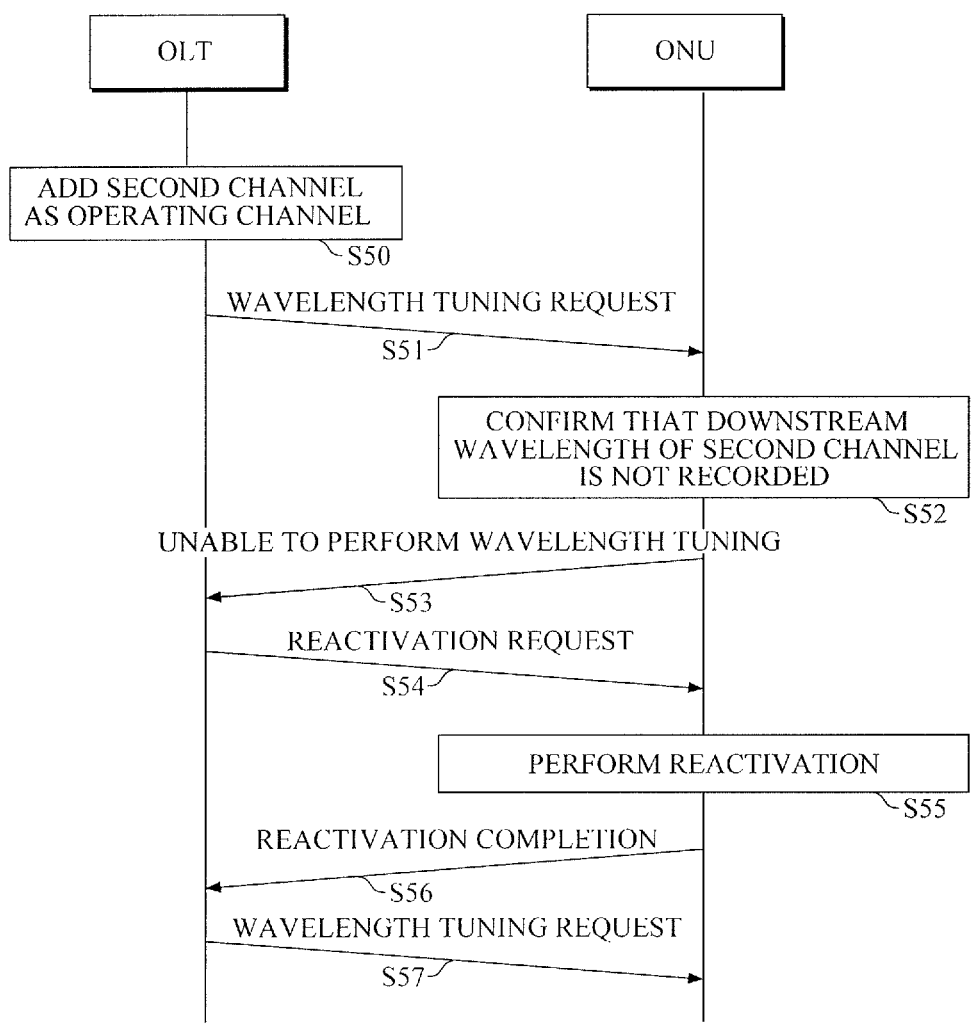
FIG. 15 is a flowchart illustrating a fourth example of the wavelength tuning method.

FIG. 15 is a flowchart illustrating a fourth example of the wavelength tuning method. The example illustrated in FIG. 15 is a case where the OLT sends a reactivation request to an ONU when the ONU has sent a NACK message in response to a wavelength tuning request message from the OLT. In such a case, the ONU re-scans downstream wavelengths during the reactivation operation.

Referring to FIG. 15, a second channel is added as an operating channel of the TWDM-PON in which at least a first channel is working in S50. The OLT sends to the ONU the wavelength tuning request message to request the ONU to change from the first channel to the second channel that has been newly added, as depicted in S51. Then, the ONU that has received the wavelength tuning request message from the OLT determines whether the downstream wavelength of the second channel has been recorded on the ONU itself, and then confirms that the downstream wavelength of the second channel is not recorded in S52. The ONU sends the NACK message to OLT in S53.

The OLT that has received the NACK message sends to the ONU a request message for performing again the activation operation, e.g., the reactivation request message in S54. The reactivation request message may be of a specific format, but exemplary embodiments are not limited thereto. In this example, as the reactivation request message, a PLOAM message that indicates the reactivation operation or carries information for such a purpose may be used.

Then, the ONU that has received the reactivation request message from the OLT performs the reactivation operation in S55. During the reactivation operation, the ONU records a wavelength of a downstream signal that is recognized by scanning downstream wavelengths while varying the wavelength of a tunable receiver in the process of the physical synchronization. Then, the ONU sends a reactivation completion message, as a response message, to the OLT in S56. The ONU sends to the OLT the reactivation completion message using an upstream wavelength which was previously used for upstream communication. In addition, as the wavelength scan completion message, a PLOAM message that indicates the completion of reactivation or carries information for such a purpose may be used. The OLT that has received the reactivation completion message sends a wavelength tuning request message to the ONU in S57. The subsequent operations after S57 may be performed according to the operation S12 and following operations illustrated in FIG. 6.

According to a fifth example of the wavelength tuning method, the OLT receives a report on wavelength recording conditions periodically or when necessary, and may use an algorithm for sending a wavelength tuning request based on the record. For example, the OLT and the ONU may operate according to the following procedures.

1. First, the OLT requests the ONU to send the currently recorded wavelength information. For example, for the request for sending the wavelength information, the US_WLCH_info PLOAM message that is defined in G.989.3 draft may be used.

2. When the ONU sends wavelength information, the OLT compares the received wavelength information with information on wavelengths of channels through which the ONU itself provides services.

3. If the wavelength information of the OLT and the wavelength information received from the ONU do not match each other, the OLT requests the ONU to re-scan downstream wavelengths. For example, as a request for downstream wavelength re-scanning, the calibration request PLOAM message shown in FIG. 13 may be used.

According to a sixth example of the wavelength tuning method, the ONU sends a NACK message in response to a wavelength tuning request message from the OLT, and the OLT may use an algorithm for sending a message for requesting for wavelength re-scanning (hereinafter, referred to as a wavelength re-scanning request message) in response to the NACK message. For example, the OLT and the ONU may operate according to the following procedures.

1. The OLT sends a wavelength tuning request to the ONU.

2. In response to the wavelength tuning request, the ONU sends to the OLT a notification of being unable to perform wavelength tuning, as well as currently recorded wavelength information.

3. The OLT that has received the notification issues a request for wavelength re-scanning to the ONU.

According to the exemplary embodiments as described above, when a system, such as a TWDM-PON system, which is capable of operating multiple channels additionally operates another channel of a downstream wavelength that is different from downstream wavelengths which have been recognized by and recorded on an ONU during the previous activations, the ONU that has established a link using a particular channel is enabled to change from the current channel to the newly added channel. Therefore, the existing ONU is allowed to be provided with a service over the channel that is newly added as an operating channel of the TWDM-PON system, so that the efficient system operation, such as traffic distribution, is possible.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of tuning a wavelength in a time and wavelength division multiplexing-passive optical network (TWDM-PON) having a plurality of operable channels, the method comprising operations of:
(a) after a second channel is added as an operating channel of the TWDM-PON in which at least a first channel is working, sending a wavelength tuning request message from an optical line terminal (OLT), which is providing a service to an optical network unit (ONU) through the first channel, to request the ONU to change from the first channel to the second channel;
(b) in response to receiving the wavelength tuning request message, determining, at the ONU, whether or not a downstream wavelength of the second channel has been recorded on the ONU; and
(c) in response to a determination that the downstream wavelength of the second channel is recorded on the ONU, sending to the OLT an ACK message that indicates that the ONU is able to perform wavelength tuning, and then commencing wavelength tuning to the second channel, and in response to a determination that the downstream wavelength of the second channel is not recorded on the ONU, sending to the OLT a NACK message that indicates that the ONU is unable to perform wavelength tuning.

2. The method of claim 1, wherein the NACK message comprises NACK code that indicates a specific cause of the ONU being unable to perform wavelength tuning.

3. The method of claim 2, wherein the NACK code indicates one of the following: "NACK by not ready yet," "NACK by out of supported TX tuning range," "NACK by out of supported RX tuning range," "NACK by out of both supported TX and RX tuning range," and "NACK by lacking wavelength channel calibration information".

4. The method of claim 1, wherein the wavelength tuning request message comprises new indication code that indicates whether the second channel is to be newly added as an operating channel.

5. The method of claim 1, further comprising, prior to the operation (c):
(d) in response to a determination in (b) that the downstream wavelength of the second channel is not recorded, scanning, at the ONU, downstream wavelengths while varying a receiving wavelength of a tunable receiver; and (e) recording, at the ONU, a found downstream wavelength.

6. The method of claim I, further comprising, prior to the operation (a):
   (f) sending, from the OLT, a wavelength re-scanning request message to the ONU to request the ONU to re-scan downstream wavelengths; and
   (g) sending, from the ONU that has completed downstream wavelength re-scanning in response to the wavelength re-scanning request message, a message (hereinafter, referred to as a "wavelength re-scanning completion message") to the OLT to notify of completion of wavelength re-scanning.

7. The method of claim 1, further comprising, after the operation (c):
   (h) in response to receiving the NACK message, sending, from the OLT, a wavelength re-scanning request message to the ONU;
   (i) sending, from the ONU that has completed downstream wavelength re-scanning in response to the wavelength re-scanning request message, a wavelength re-scanning completion message to the OLT; and
   (j) in response to receiving the wavelength re-scanning completion message, re-sending a wavelength tuning request message from the OLT to the ONU to request the ONU to change to the second channel.

8. The method of claim 7, further comprising, prior to the operation (h):
   (k) in response to receiving the NACK message, sending, from the OLT, a wavelength information request message to the ONU to request the ONU to send wavelength information that is recorded on the ONU; and
   (l) in response to the wavelength information request message, sending, from the OLT, a wavelength information response message that carries wavelength information that is recorded on the ONU to the OLT.

9. The method of claim 1, further comprising, prior to the operation (c):
   (m) in response to receiving the NACK message, sending, from the OLT, a reactivation request message to the ONU to request the ONU to perform again a reactivation operation;
   (n) in response to receiving the reactivation request message, sending, from the ONU, a reactivation completion message to the OLT to notify of completion of reactivation; and
   (o) in response to receiving the activation completion message, sending again, from the OLT, the wavelength tuning request message to the ONU to request the ONU to change to the second channel.

10. The method of claim 9, further comprising, prior to the operation (m):
   (p) In response to receiving the NACK message, sending, from the OLT, a wavelength information request message to the ONU to request the ONU to send wavelength information that is recorded on the ONU; and
   (q) in response to the wavelength information request message, sending, from the OLT, a wavelength information response message that carries wavelength information that is recorded on the ONU to the OLT.

* * * * *